Figure 1:
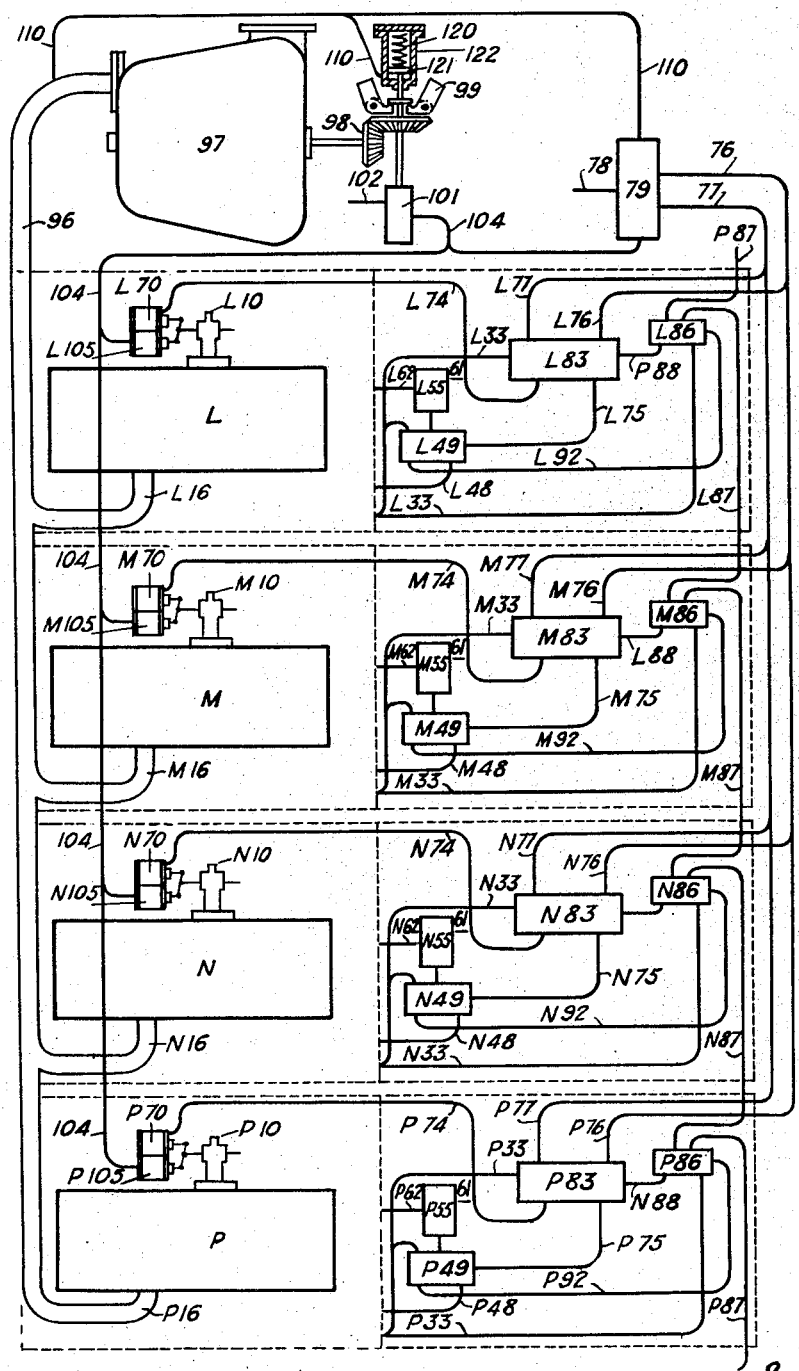

July 11, 1950  R. J. WELSH  2,515,065
MEANS FOR CONTROLLING THE CYCLIC OPERATION OF
COMPONENTS OF A POWER PLANT
Filed Nov. 26, 1945  8 Sheets-Sheet 1

Inventor:
Robert J. Welsh
By Babcock & Babcock
Attorneys

July 11, 1950

R. J. WELSH 2,515,065

MEANS FOR CONTROLLING THE CYCLIC OPERATION OF
COMPONENTS OF A POWER PLANT

Filed Nov. 26, 1945

8 Sheets-Sheet 3

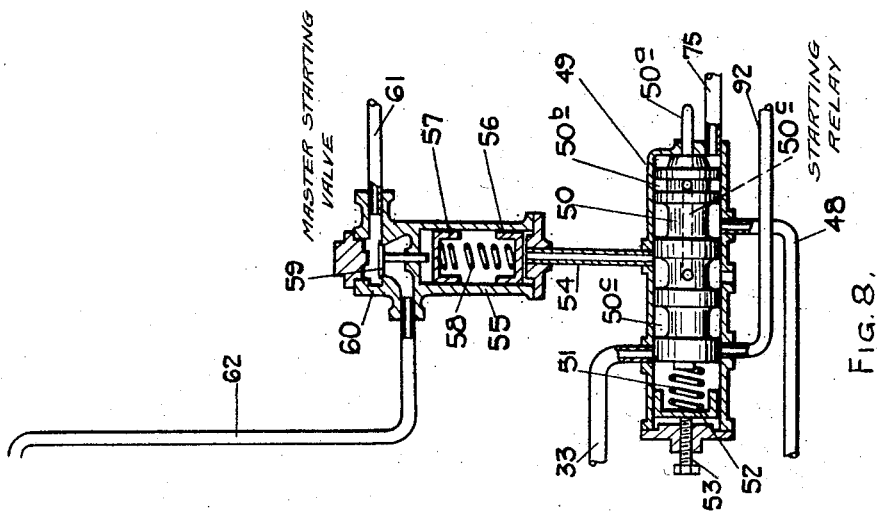
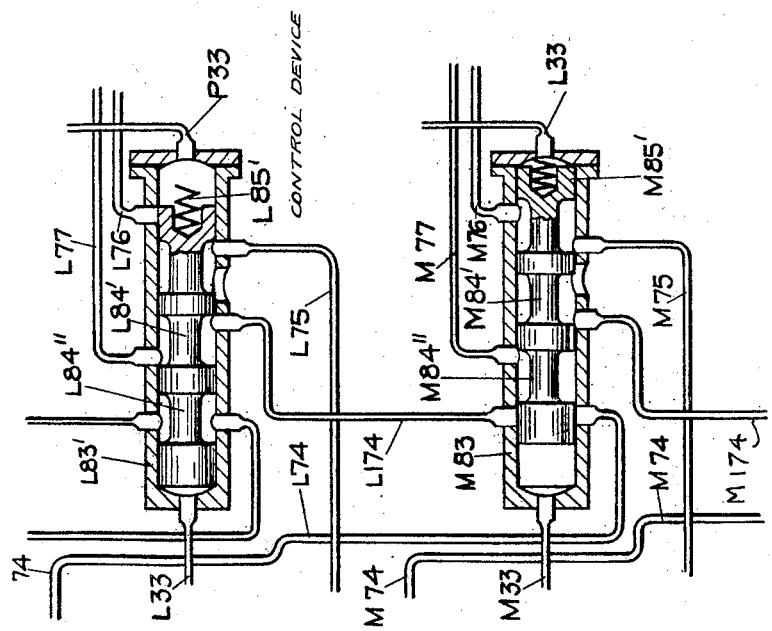

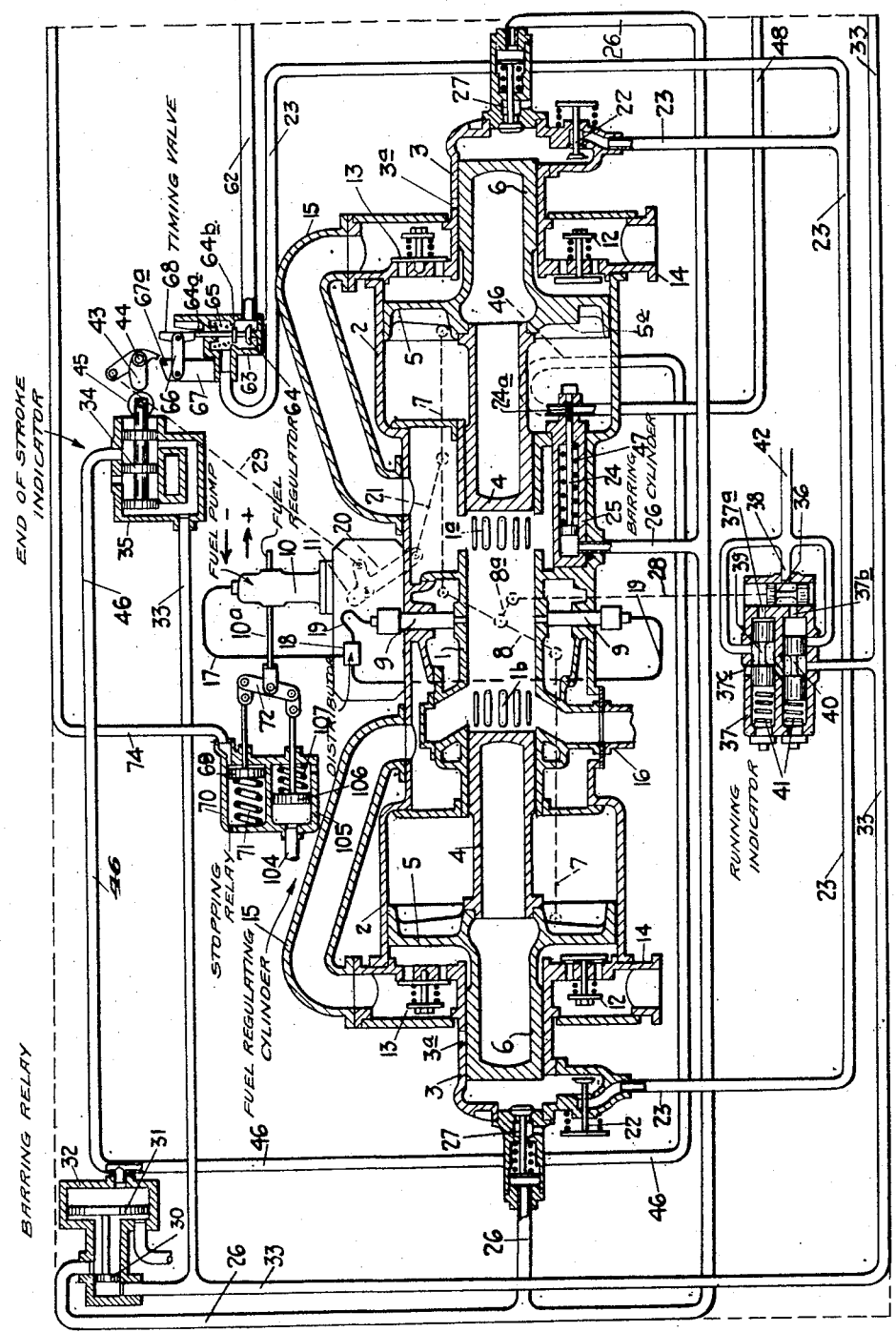

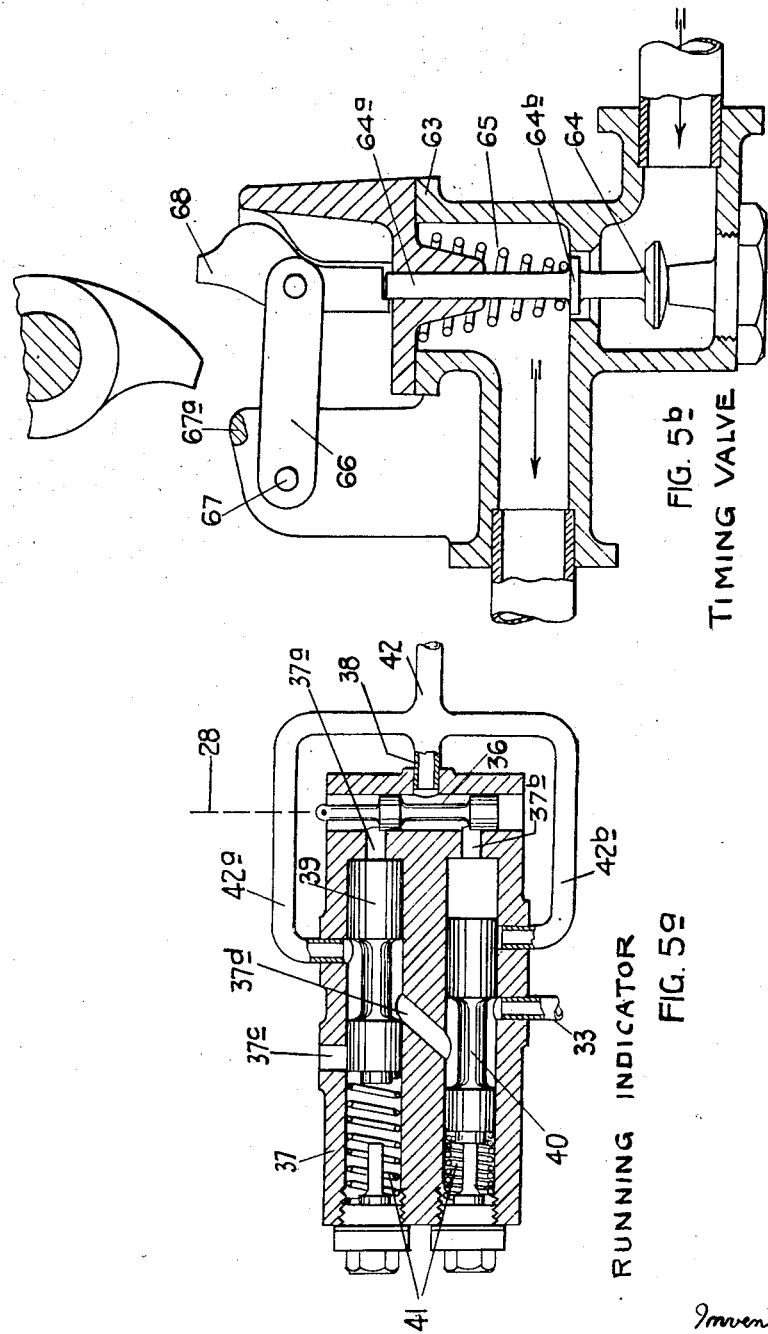

Patented July 11, 1950

2,515,065

UNITED STATES PATENT OFFICE 2,515,065

MEANS FOR CONTROLLING THE CYCLIC OPERATION OF COMPONENTS OF A POWER PLANT

Robert James Welsh, Rugby, England, assignor to The English Electric Company Limited, London, England, a British company Application November 26, 1945, Serial No. 630,815
In Great Britain September 10, 1943

Section 1, Public Law 690, August 8, 1946
Patent expires September 10, 1963

4 Claims. (Cl. 60—13)

This invention relates to the operation of a power plant made up of a plurality of internal-combustion compressor devices of which the number in operation is variable—e. g., in accordance with the load on the plant. More particularly the invention is concerned with the control of such plant so that both the starting and the stopping of the component compressors in succession will take place in the same predetermined cyclic order— e. g., the order L—M—N—P—L—M— and so on. According to the co-pending patent application No. 546,360, now Patent No. 2,434,778 issued January 20, 1948, there is provided a plurality of start-and-stop control devices associated with individual components and adapted jointly to make connections whereby a signal can start a component at rest if it be next in cyclic order to a component which has been brought into action and another signal can stop that one of the said components in action which was first to start; each of these control devices is connected to starting and stopping devices for one component (such as M) and is influenced by the starting and/or stopping of the immediately preceding component in cyclic order (i. e., L). The above desired result is thus achieved by a combination of a number of separate control devices each associated with individual components whereby any desired power plant can be built up by taking the desired number of components each with its individual control device and appropriately connecting these devices together.

In the actual arrangement described in said Patent No. 2,434,778 there is a biassed control member—which may be a fluid-controlling valve—movable to one position or the other according to whether one particular component such as L is in action or at rest. This control member has a number of controlling ports through which is passed a starting signal—when component L is in action—to start component M if that component be at rest and through which is passed a stopping signal—if component L be at rest—to component M if the latter be in action. Each control device such as that for component M also includes a throw-over member responsive to the starting and stopping of components L and M to ensure that when all the components are in action a stopping signal will be passed on to the first component to start—i. e. that which is next in cyclic order to the last to start.

The present invention consists of a modified control device which can achieve the same results or slightly modified results with a certain amount of simplification of the connections. According to one feature of the present invention the start-and-stop control device in association with one component such as M and the preceding one in cyclic order—i. e., component L—and controlling the starting and stopping of component M is influenced by both components L and M so as to tend to take up one position when the component M is in action and L is at rest and another position when the component L is in action and M is at rest; another such control device is similarly linked to components M and N and so on. Each of these control devices may be biassed to a third or mid position.

Figure 2:
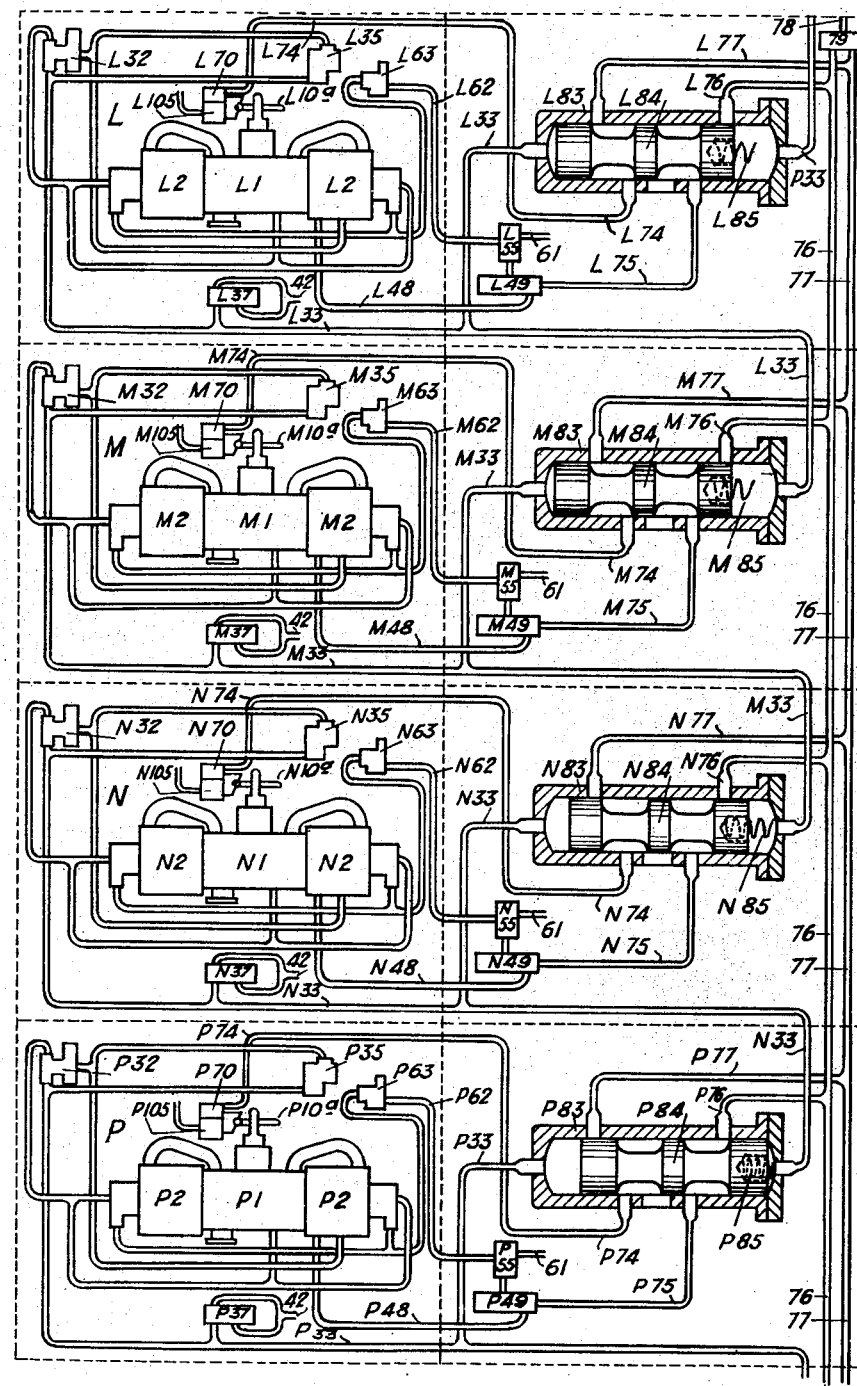
Figure 3:
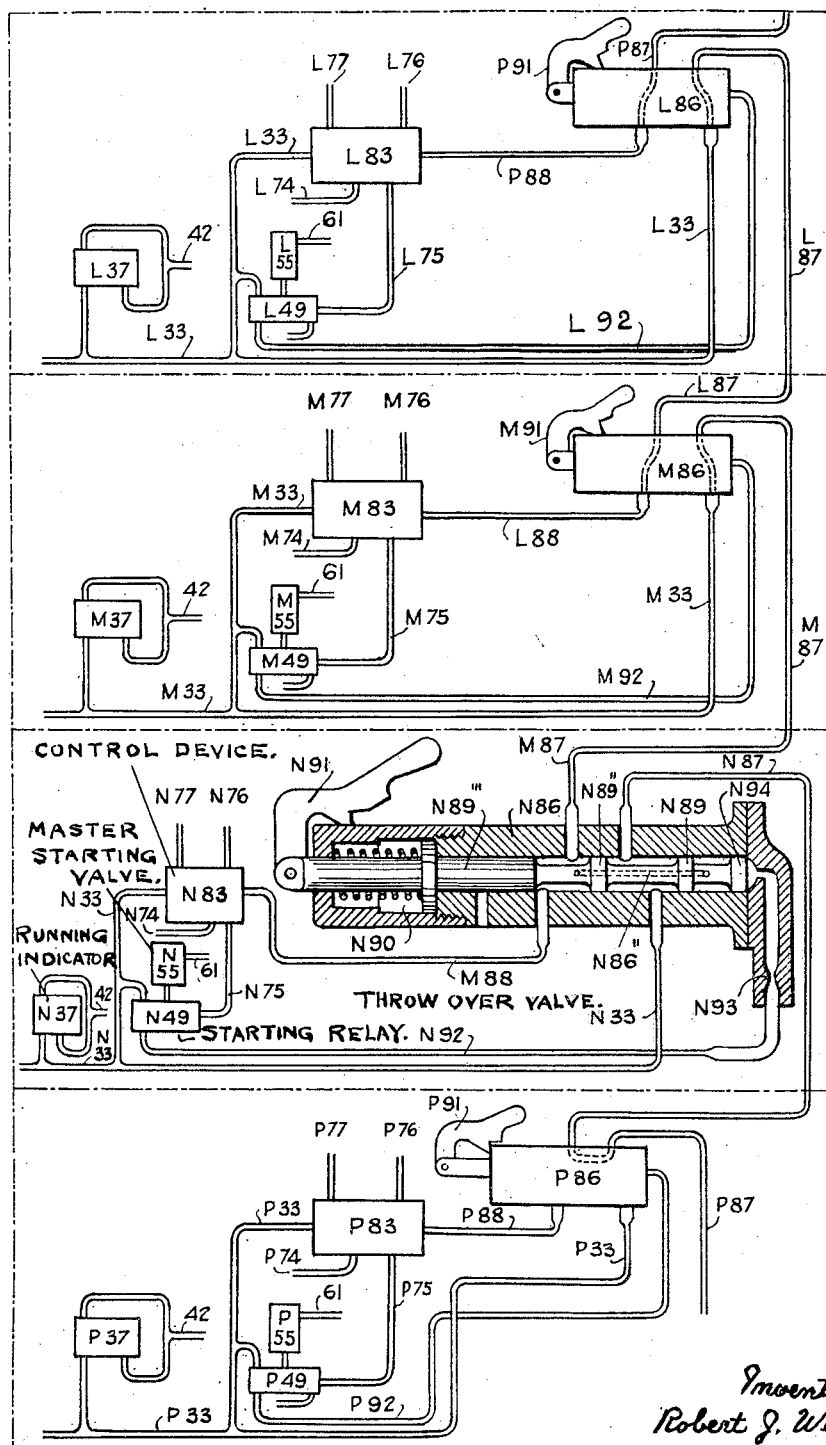
Figure 6:
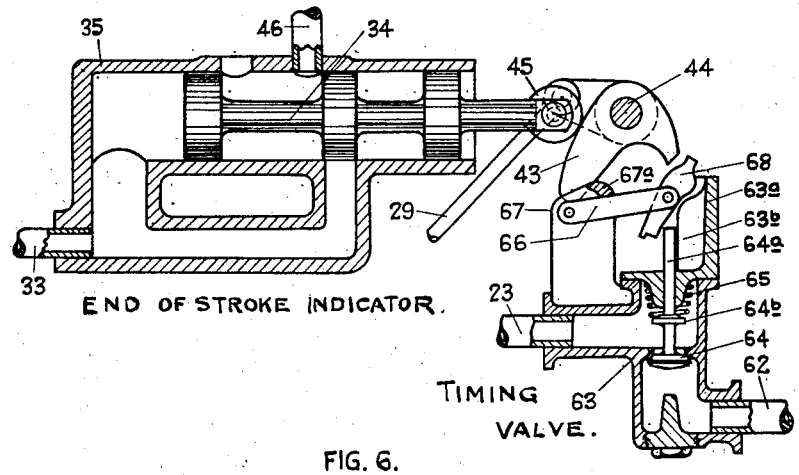
Figure 7:
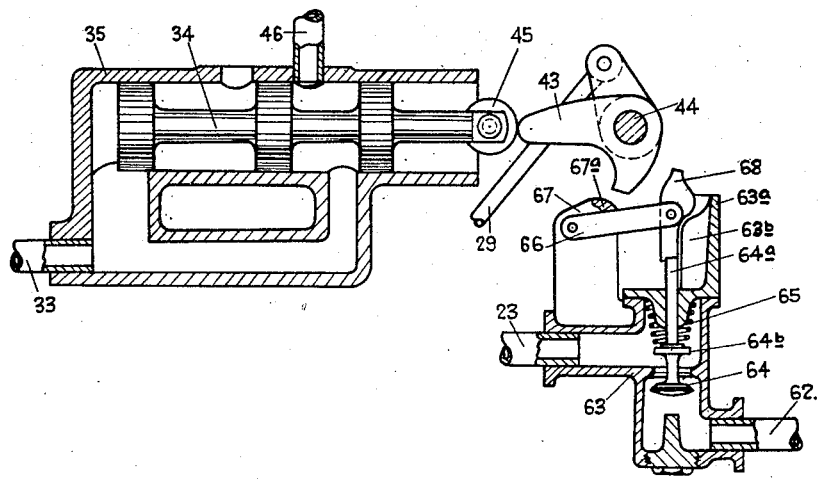
Figure 9:
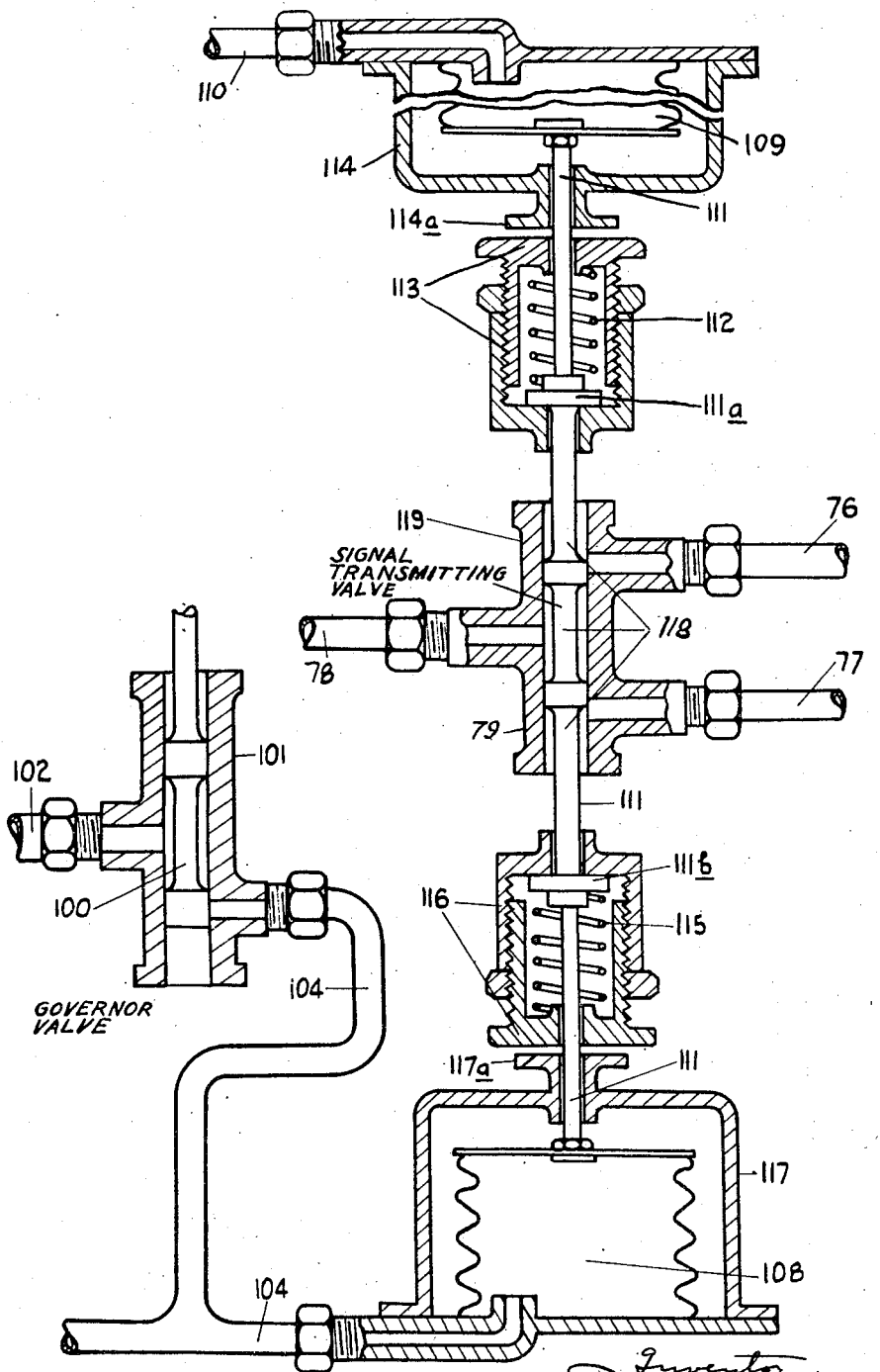

One form of power plant incorporating the invention and comprising a number of power components each of which is an internal combustion compressor of the known free-piston type in combination with compressed air starting means for the engine of the compressor and start-and-stop control devices therefor in the form of fluid pressure controlling valves is illustrated by the accompanying drawings of which:

Fig. 1 is a general arrangement of the complete plant, showing all the parts in external view, Fig. 2 is a view to a larger scale showing the start-and-stop control devices in detail but with the compressor devices in external view but without the by-passing devices, which are indicated in Fig. 1, Fig. 3 shows the addition of the automatic by-passing devices to the arrangement according to Fig. 2, Fig. 4 shows a modification of the arrangement according to Fig. 2, Fig. 5 is an enlarged detailed view of one of the compressor devices of Fig. 2, and Figs. 5a and 5b are details thereof, in section, on a still larger scale, Figs. 6 and 7 show, also to a still larger scale two of the auxiliaries of Fig. 5 in two different positions, Fig. 8 is an enlarged section through one of the starting relays of Figs. 1 and 2, and Fig. 9 is an enlarged section through the starting signal transmitters of Figs. 1 and 2.

The plant is shown in Figs. 1 and 2 as comprising four similar power components L—M—N and P, which are in the left-hand four of eight rectangles into which part of Fig. 1 and the whole of Fig. 2 are divided; each start-and-stop control device is shown beside one of the power components to which it is linked, in the adjoining right-hand rectangle.

Each power component is a free-piston internal-combustion compressor similar to L which is shown in longitudinal section in Fig. 5. In this figure, the body of the free-piston type internal combustion compressor comprises the engine cylinder 1, the pair of compressor cylinders 2 at opposite ends thereof and the pair of buffer cylinders 3 at the extreme outer ends while each free-piston unit consists of one of the opposed engine pistons 4 reciprocating in cylinder 1, a compressor piston 5 reciprocating in one of the cylinders 2 and a buffer piston 6 reciprocating in one of the cylinders 3. In the head of each compressor cylinder 2 is at least one inlet valve 12 which can put the cylinder 2 in communication with the suction inlet 14 and at least one discharge valve 13 which can put the cylinder 2 in communication with the conduits 15 communicating with the annular space surrounding the ring of inlet ports 1a in the engine cylinder 1. The ring of exhaust ports 1b in the latter open into an annular space communicating with the discharge conduit 16.

The reciprocating piston units are synchronised in well known and usual manner by being linked by the pair of links 7 to the opposite ends of the lever 8 having its mid point pivotally supported on the outside part of the engine cylinder 1.

Fuel can be injected into the cylinder 1 by fuel injectors 9 of conventional form supplied through fuel pipe 17, the usual form of distributor 18 and the fuel pipes 19 by the fuel injection pump 10 of conventional form reciprocated by cam 11 which is oscillated (in accordance with the movement of the free piston units) by the bell-crank lever 20 which is connected by link 21 to a point on one of the links 7. The quantity of fuel injected by each stroke of the injection pump 10 is determined in the usual manner by the position of the fuel regulator 10a.

Each buffer cylinder 3 is provided with an opening controlled by the non-return valve 22 forming an inlet valve through which compressed air can be admitted from pipe 23 for starting the engine. In addition, each buffer cylinder has a vent governed by the compression relief valve 27 which can be opened by the application of fluid pressure from pipe 26.

A barring piston 24 movable in cylinder 25 is provided for moving the opposed piston units apart and out to the extreme outer end of their stroke on the stopping of the engine; the pistons are left in this position ready for restarting. This resetting operation is performed in response to the application of fluid pressure to the cylinder 25 through resetting control pipe 26. The application of fluid pressure to pipe 26 is controlled, as hereinafter described, by the "running indicator" 37, a "barring relay"—comprising a valve device made up of coupled pistons 30 and 31 movable in cylinder body 32 by the application of fluid pressure thereto from pipe 33—in cooperation with an "end of stroke indicator" (shown enlarged in Figs. 6 and 7) comprising also a triple piston valve 34 movable in cylinder 35 and also controlled in part by the application of fluid pressure thereto from pipe 33 and partly by the action—through link 29—of the opposed engine pistons when they reach or closely approach their outer dead centre position.

The "running indicator" (Fig. 5a) is a hydraulic device comprising piston valve 36 reciprocated by the link 28 in a transverse cylinder in the body 37. In a "rest" position such as shown, fluid pressure passes from pipe 42 through one of the two branch pipes 42a or 42b past the recess in one of the pistons 39, 40 to the pipe 33 and reaches, also, through pipe 38, the recessed portion of the piston valve 36, and from there, though either port 37a or (as shown) port 37b, the associated cylinder of piston 39 or (as shown) piston 40. The cylinder of the other piston, for example, of 39, as shown, is drained to exhaust into the oil sump (not shown) through its port 37a. It is clear from Fig. 5a that, if the position of the pistons 39, 40 were reversed, or both pistons were in their right hand position, the connection of pipe 33 with the pressure fluid supply from pipe 42 would still subsist.

As soon, however, as the free piston assembly is reciprocating, the piston valve 36 is oscillated through its link connection 28 with the free piston assemblies, and consequently sufficient fluid pressure is passed through pipe 38 round the recess of valve 36 and both ports 37a and 37b to force both pistons 39 and 40 to the left against their weak springs 41. Ports 37a and 37b are of a restricted cross section and do not allow the escape of pressure to exhaust into the oil sump quickly enough to affect the building up of pressure inside the cylinders for the pistons 39, 40. It is clear from Fig. 5a that in this position of the "running indicator," pipe 33 is cut off from pipe 42, and is vented to exhaust into the oil sump at 37c past the recessed portions of both pistons 39, 40 and the oblique canal 37d in the body of the casing 37.

The fluid pressure in pipe 33—as soon as the engine stops—moves the piston unit 34 of the "end of stroke indicator" outward to the position shown in Fig. 6 in which it can be operated by motion of the free pistons and by acting on the smaller piston 30 of the "barring relay" the pressure moves this also in one direction, to allow the fluid under pressure to pass by way of pipe 26 to open the compression relief valves 27 in the buffer cylinders and also to enter the barring cylinder 25, thus causing the barring piston 24 to move outwards so as to bear against shoulder 5a of the piston 5 and to drive the free pistons which are linked by the linkage 7, 8, 7 to their outer dead centre position. When the free pistons approach or reach their outer dead centre position a cam 43 actuated by them through link 29 and the lever 20 connected by the link 21 to the synchronising linkage, is rocked about the fixed pivot 44 from the position shown in Fig. 6 to that shown in Fig. 7 to engage a roller 45 on the projecting end of the piston rod of the "end of stroke indicator," forcing the triple piston 34 inwards to the position shown in Figs. 5 and 7 and thereby connecting the fluid pressure from pipe 33 by way of pipe 46 to a rear part of the barring relay, behind the piston 31 which is shown as of greater area than the front piston 30 so that the force from the rear will overcome that from the front. The latter relay is thus moved back to its normal position (as shown in Fig. 5) to disconnect pipe 26 and the barring cylinder 25 from the pipe 33 and to connect them to exhaust into the oil sump, whereby the barring piston 24 is withdrawn by the action of a biassing force such as that of a spring 47 and the relief valves 27 in the buffer cylinders 3 can reclose. The barring piston 24, when completely withdrawn, re-establishes a connection from the pipe 33 through the "end of stroke indicator" cylinder 35, pipe 46, and ports uncovered and put into communication by the reduced portion 24a of the piston rod of the barring piston 24—to pipe 48 and a port in a "starting relay" 49 hereinafter described with reference to Fig. 8. When the barring piston and co-operating parts have gone through the operations described the whole equipment is then reset and ready for restarting, the resetting having taken place automatically in immediate response to the stopping of the engine.

The signal to restart the engine is given by the application of fluid pressure to the port 75 in the right-hand end of the cylinder 49 of the starting relay shown in enlarged section in Fig. 8; the resulting movement to the left of piston valve 50 in the cylinder 49 against the force of spring 51 (which bears against the abutment 52 adjustable by screw 53) puts the said pipe 48 in communication through pipe 54 with the cylinder 55 of the servo-motor for actuating the master starting valve 59. Movable within cylinder 55 is a piston unit made up of parts 56 and 57 with spring 58 compressed between them; the part 57 can engage the stem of the master starting valve 59 which, when the valve is closed, rests on a seating in the valve casing 60. Provided that the corresponding "running indicator" 37 is in the "rest" position (Figs. 5 and 5a), that the "end of stroke indicator" 35 (Figs. 5 and 7) is in the position corresponding to the free pistons being in the outer dead centre position and that the barring piston 24 is fully withdrawn, it will be clear that fluid under pressure can then pass from the supply pipe 42 through the pipes 33, 46, 48 and 54 to the cylinder 55 and so cause piston part 57 to lift the master starting valve 59 off its seating. Compressed air for starting purposes from pressure pipe 61—which constitutes a source of comparatively unrestricted capacity—is hence admitted to the now closed buffer cylinders 3, by way of pipe 62, the body 63 of a "timing valve" provided for subsequently cutting off the air suppy to the cylinders 3, the pipe 23 and non-return starting inlet valves 22.

The "timing valve" 64 has three positions in the body 63, viz: (1) closed, as in Fig. 6, (2) fully open, as in Fig. 7, and (3) wholly released, as in Figs. 5 and 5b; it is biassed to position (3) by a spring 65 which holds the valve considerably clear of its seating. The valve device includes a lever 66 pivotally mounted outside the valve casing on a lug 67 extending therefrom; a trigger 68 is pivotally mounted on this lever and normally positioned directly adjacent to the end of the stem 64a of valve 64, which stem projects through the valve casing 63. The lever 66 is biassed by gravity to a position in which the trigger 68 abuts against the valve stem 64a but the lever is free to make a small movement until arrested by a stop 67a formed by the lug 67. The onrush of the air entering body 63 from pipe 62 causes suction on the upper side and pressure on the lower side of the "timing valve" 64 itself and pressure on the under side of the collar 64b to move it (against the biassing force of spring 65) from position (3) shown in Figs. 5 and 5b to its position (2) or "fully open" position, shown in Fig. 7, thus allowing air to pass by pipe 23 to the buffer cylinders 3. In position (3) a collar 64b on the valve stem 64a lying within and considerably restricting the valve aperture acts to delay the building up of pressure on the discharge side of the "timing valve" thereby accelerating the opening movement of this valve while at the same time delaying the initial movement of the free pistons by delaying the building up of air pressure in the buffer cylinders. This also eliminates the risk of the free pistons moving so quickly as to be beyond the correct position for cutting off the starting air before tripping the trigger as described below. The valve stem 64a, during the movement of the valve to the open position, bears against the trigger 68 which with lever 66 thus acts as a stop. The thrust of the valve stem against the trigger is on a line passing through the pivot of the trigger which therefore does not turn about its pivot but the lever 66 moves until arrested by the stop 67a. This movement of the valve and trigger, by which the valve moves to but is held in the fully open position, brings a part of the trigger 68 into the path of a part of the cam 43 actuated by the free pistons through link 29. As the pistons pass a certain point before reaching the inner dead centre position, the trigger 68 is accordingly engaged by cam 43 and turned about its pivot on lever 66 so that it releases the "timing valve," allowing the latter, under the action of the air pressure, to continue its movement to the first or closed position (Fig. 6) whereby the buffer cylinders 3 are no longer connected to the pipe 62 and the pressure pipe 61. The valve stem 64a then bears on the trigger 68 in such a way as to hold it out of the path of the cam 43 as the latter oscillates. It will be seen that the starting air supply is cut off and the "timing valve" mechanism does not interfere with subsequent normal operation of the free piston device. Subsequent reclosure of the "master starting valve" 59 (cutting off the supply of air) allows the "timing valve" to return under the action of its biassing spring 65 and together with the lever 66 and trigger 68 to the wholly disengaged position so that the trigger remains out of the path of the member adapted to engage it. The movement of the free pistons will actuate the "running indicator" to disconnect the pipe 33 from the supply pipe 42 and connect it to exhaust into the oil sump. Pressure is thus removed from the piston unit 34 of the "end of stroke indicator," which will accordingly remain in the withdrawn position and be unaffected by the subsequent operation of the engine and from pipes 46, 48 and 54 so that the pistons 56 and 57 will allow the "master starting valve" 59 to reclose.

Referring again to Fig. 1, the gas exhausts of the components L, M, etc. are therein designated L16, M16, etc. and all discharge into the manifold 96 supplying motive fluid to the turbine 97. The latter drives, through gearing 98, the speed governor 99 which can move governor valve 100 in body 101 (shown in section in Fig. 9) to connect fluid pressure supply pipe 102 to pipe 104 on a fall in speed and the latter pipe 104 to exhaust into the oil sump through the lower opening in the valve body 101 on a rise in speed. Pipe 104 is connected to the fuel-regulating cylinders L105, M105, etc.

As shown in Fig. 5, each cylinder 105 contains a piston 106 movable by the fluid pressure against the force of spring 107 to move the link 72 and thereby move the fuel regulator 10a in a direction to increase the fuel supply. The engine can be stopped by temporarily cutting off the fuel supply by moving the fuel regulator 10a to the position in which the pump 10 delivers no fuel. This is done by the stopping piston 69 which can move in the cylinder body 70 (forming the stopping relay) against the force of spring 71 when fluid pressure is applied to the relay from pipe 74; this movement is again communicated to the fuel regulator 10a by the link 72, the pistons 106 and 69 being connected to opposite ends of link 72. Thus it will be seen from the foregoing that each of the power components L—M—N—P can be stopped by the application of a stopping impulse to the stopping relay 70 by pipe 74, the parts being automatically reset in a condition for restarting, and each can be restarted by the application of a starting impulse to the starting relay 49 by pipe 75.

The starting and stopping signals are applied to the various devices L49, L70, etc. from the starting and stopping signal lines 76 and 77 common to the whole plant (see Figs. 1 and 2), which lines are pipes either of which can be connected to the fluid pressure supply pipe 78 by the signal-transmitting valve device 79 shown in section in Fig. 9. This device includes an expansible bellows 108 connected to the control pipe 104 supplying the fuel-regulating motors 105 and mechanically connected by stem 111 to a similar bellows 109 responsive to the pressure of the gas supplied to the turbine inlet by being connected to manifold 96 adjacent that inlet through the pipe 110. The pressure in bellows 109 acts on bellows 108 through stem 111. A spring 112 in a spring case 113 is compressed between the spring-case 113 and the head 111a on the stem 111; when the spring case 113 abuts against the stop 114a on the bellows case 114 the force of spring 112 assists the pressure of bellows 109 acting in opposition to the pressure in bellows 108. A further spring 115 in a spring case 116 is compressed between this spring case 116 and head 111b on stem 111; when the spring casing 116 abuts against the stop 117a on the bellows case 117, the force of spring 115 reduces the effect of the opposition of the pressure of bellows 109 to the pressure in bellows 108. The stem 111 carries a double piston valve device 118 slidable in a valve body 119 to either side of a normal position.

When the pressure of the fluid supplied to the fuel regulating cylinders 105 by pipe 104 exceeds a predetermined value, which depends upon the pressure in bellows 109 and which accordingly increases with increase in the gas pressure in manifold 96, the bellows 108 can move the stem 111 and valve device 118 against the combined force of the spring 112 and bellows 109 and thereby connect the fluid pressure supply pipe 78 to the starting signal line 76 and so give a starting signal. When, on the other hand, said fluid pressure applied to the fuel regulating cylinders 105 by pipe 104 falls below a predetermined value (which value again increases with increase in the gas pressure in manifold 96), the force applied to the stem 111 by the bellows 109 exceeds the force applied by the bellows 108 and so can move the stem 111 and valve 118 to connect the pipe 78 to the stopping signal line 77. If device 79 were not responsive to the gas pressure in manifold 96, then another compressor would be started each time the fuel supply per gas generator is increased above a certain fixed value. Similarly, a gas generator would be stopped each time the adjustment of the fuel regulators decreased the fuel supply per compressor below a certain fixed value. Such an arrangement would not operate the plant to the best advantage. At constant piston stroke and speed the power output of a free-piston compressor varies in the same sense as the output pressure but not necessarily in direct proportion thereto; thus the maximum output of a single compressor working at a somewhat low pressure is less than when it is supplying gas in common with others at a higher pressure and hence the fuel supply can be increased only to a value less than that corresponding to full load and possibly to less than that corresponding to optimum load. If the successive starting and stopping of compressors occurs always at the same fuel adjustment this will be limited to a point not exceeding that corresponding to the maximum possible fuel supply to a single compressor working at minimum pressure whereas for working under most economical conditions it will usually be advisable to raise the starting or stopping point or both as increase in pressure makes this possible. This is achieved with the device described, which is actuated differentially in accordance with fuel adjustment and gas discharge pressure, so that the starting or stopping signal is given at a value of fuel supply per compressor which increases with increase of gas discharge pressure.

When one compressor alone is operating, the fuel supply thereto is progressively increased in response to increase in the load on the turbine until, at some fuel supply $x$ less than the maximum the fluid pressure in the bellows 108 is sufficient to cause a starting signal and a second compressor is started. The turbine speeds up, the governor 99 responds and the fuel supply to both compressors is immediately decreased but will again increase on further increase in load on the turbine; owing to the increase in gas pressure in bellows 109 the fuel supply to each compressor in action must be increased to a value greater than $x$ and the fluid pressure in the bellows 108 increased to a correspondingly higher value before another starting signal is given, and so on. When all or nearly all of the compressor devices are in operation, supplying a nearly fully loaded turbine at high pressure, a decrease in the fuel supply compressor to a value $z$ will cause a stopping signal to be given whereas, owing to the decrease in gas pressure in bellows 109, the next stopping signal will not be given until the fuel supply is less than $z$, and so on. The two springs 112 and 115 facilitate separate adjustment of the fuel supplies at which starting and stopping signals are given.

The governor 99 as shown in Fig. 1, is loaded by spring 120 and includes a speed adjuster comprising a piston 121 movable in cylinder 122 to which is applied, through pipe 110, the pressure in the manifold 96 in opposition to the force of loading spring 120. Thus the speed at which the governor brings the valve 101 to its mid-position—i. e., the speed at which the governor tends to keep the turbine running—is controlled by this speed-adjuster and is decreased with increase in the pressure of the motive gas supplied to the turbine.

The connecting lines from the starting and stopping signal lines 76 and 77 to the starting and stopping devices are controlled by the control devices L83, M83, etc., in such manner that the power components will start in cyclic order L—M—N—P—L—M, etc., in response to successive starting signals or one long-sustained starting signal and will stop in the same cyclic order in response to separate stopping signals or one long sustained stopping signal, the first to start being thus also the first to stop. The control devices are all alike, as can be seen in Fig. 2. Control device L83, for example, consists of a cylinder and also a piston valve L84 movable in the cylinder of L83 to either side of a mid-position. Fluid pressure from the "running indicator" L37, when component L is at rest, is applied through pipe L33 to the left hand end of cylinder L83 tending to move the piston valve L84 therein to the right, from the position in which it is shown, against the force of a biassing spring L85 which tends to return the valve M84 to the mid-position. Fluid pressure from the "running indicator" L37 is applied through pipe L33 to the right hand end of cylinder M83 when component L is at rest, tending to move the piston valve M84 to the left into the position corresponding to in which L84 is shown and in which it will stay unless acted on solely by pressure from the "running indicator" M37.

The devices are shown as if L is at rest, M and N in action, and P at rest. Thus since component P is at rest and the preceding component N is in action, piston valve P84 is in the right hand position. Starting relay P49 is accordingly connected through pipes P75 and P76 to the starting signal line 76. Thus when the next starting signal is given to starting signal line 76, component P will receive this signal and should start. In response to the starting, the "running indicator" P37 will cut off pressure from the left hand end of the cylinder P83 and there being no fluid pressure applied to either end of the piston P84 the biassing spring P85 will return the piston to its mid-position in which both the starting relay P49 and the stopping relay P70 are cut off from the starting and stopping signal pipes 76 and 77.

Also since component M is in action and the preceding component L is at rest, fluid pressure from the "running indicator" L37 will be applied to the right hand end of cylinder for M and the valve M84 will be in the left hand position connecting the stopping relay M70 through pipes M74 and M77 to the stopping signal line 77 so that the next stopping signal will go to the relay M70 and component M should accordingly stop and cause its "running indicator" M37 to apply pressure to the left hand end of cylinder M83 through pipe M33. There will now be equal pressures on opposite ends of piston valve M84 and since there is no biassing force to return the piston from its left-hand position, it will remain in this position until the subsequent starting of the preceding component L; in this condition prior to the starting of component L the control device can pass on subsequent stopping signals ineffectively and harmlessly to stopping relay M70 of component M. The subsequent starting of component L will cause pressure to be removed from the right-hand end of piston M84 so that the pressure on the left hand end will move the piston from the left-hand position to the right-hand position.

Consider again the condition in which component M is in action and the preceding component L is at rest, the piston valve M84 being in the left-hand position, but before the next component N has started. On the subsequent starting of the component N the valve N84 will return to the mid-position in which it is shown, and so on for the other components P . . . L as they start in cyclic order. The valve M84 will remain in the stopping position even after the starting of component L; the latter event will remove pressure from the right-hand end of piston valve M84 which will then have no force acting on it and will remain in position. All the power components will now be in action but only this one piston valve M84 will be in the left-hand position ready to pass on a subsequent stopping signal to the component M. Thus with the components starting one by one, the starting of the last component will leave the control equipment in a position in which the next in cyclic order—i. e., that component which was the first to start—will be the one to receive the next stopping signal.

Patent No. 2,434,778 also describes provision whereby a stopping signal is effective to stop a component only if the next component in cyclic order is in operation, this ensuring that a stopping signal is ineffective if there is only one component in operation. This can be achieved with the arrangement according to the present invention by including an extra valve part L84″, M84″ on each of the piston valves, as shown on the devices L83, M83 in Fig. 4, and by a pipe connection L174, M174 between adjacent devices L83, M83, etc. This valve part is closed only when the piston is in its right-hand position, in similar fashion to the valves described in Patent No. 2,434,778. A signal to a stopping relay such as L70 from line L77 has to go by way of line L74 and valve L84 in the device L83 and through line L174 to the valve M84″ in the device M83, and when component M is at rest this extra valve is closed to prevent the transmission of the stopping signal by line L74 to the stopping relay L70 for component L. With this arrangement the plant can be shut down only by stopping the last of the components by moving its regulator 10a by hand to the no-fuel position. When the plant has thus been shut down, it can be restarted by moving one of the starting relay members 50a (Fig. 8) by hand.

If the biasing springs L75, M85, etc., of the arrangement according to Fig. 2 be omitted, each piston valve 84 will then be such that it will occupy either its left-hand or its right-hand position; this will result in the transmission of a starting signal to a component already in action, which generally will be harmless. Stopping signals will shut down the whole plant by stopping the last power component in action, but a subsequent starting signal will automatically start that one of the components which has been longest at rest, i. e., the one next in cyclic order to the last to stop.

The addition to Fig. 2 of means for putting any one of the components L, M . . . etc., entirely out of action without interfering with the cyclic operation of the rest of the plant is shown partly diagrammatically in Fig. 3 in which however the construction of a by-passing throw-over valve N86 for component N is shown in section. Each component has a similar valve. Normally, running indicator L37 is connected through pipe L33, not directly to valve M83 as in Fig. 2, but through valve L86, pipe L87, valve M86 and pipe L88 to valve M83, the connections inside the valves L86 and M86 being indicated in Fig. 3 by dotted lines. Similarly, running indicator M37 is normally connected to pipe M88 and valve N83, etc. In effect the connections are then precisely as in Fig. 2. The valve device N86 has therein a piston valve N89 biased to the right-hand position by spring N90. In this position the throw-over piston valve N89 completes the connections between pipes N33 and N87, and pipes M87 and M88 for normal operation as described. In the left-hand position in which throw-over valve P86 is diagrammatically represented, the running indicator N37 is disconnected from control device P83 and directly connected to control device L83 by the connection together of pipes N87 and P87 as shown by the dotted line.

Throw-over valve N86 may be manually operated and moved to the left (by handle N91 serving also as a latch) when it is desired to put power component N out of action for examination. Valve P86 is shown latched in this position. In addition, the throw-over valve N86 may be moved from right to left if, after a time delay, power component N fails to start on receipt of a starting signal, so that control device N83 will be cut out of circuit after a suitable lapse of time and power component P brought into service.

On failure of a component such as N to start in response to the application of a starting signal thereto from line 76 this signal will remain applied for an abnormal time. The movement of starting relay N49 (see also Fig. 8) connects pipes N33 and N92 so causing fluid pressure from running indicator N37 to be applied through pipes N33 and N92 and through a restricted orifice N93 to one end of a piston N94 actuating piston valve N89. This piston N94 thus moves so slowly against the biassing force of spring N90 and has a stroke of such length that if component N makes a prompt start the piston N94 and valve N89 do not move far before the pressure is cut off by the running indicator N37 and the piston is returned by the spring N90. But if after a certain time the component N has failed to start, the piston N94 and throw-over piston valve N89 will have moved to a position—in which the valve is held by latch N91—to cut out the starting and stopping arrangements for the component N and pass on the starting signal to the next component P. This is accomplished by means of a port N86″ connecting the recessed valve portion between the pistons N94 and N89 with the recessed valve portion between the valve pistons N89″ and N89‴. When the valve piston N89 is in the left hand position and held there by means of the latch N91, the port N86″ connects the pipes N33 and M88. This allows pressure from the running indicator N37 to be applied to the right hand end of the throw-over piston valve N84 (Fig. 2). There are thus now equal pressures at each end of the piston valve N84 which is accordingly moved to the neutral position by the spring N85, thereby cutting out the starting and stopping signalling lines N76 and N77 respectively. The valve can be reset by releasing the latch N91 by hand. If a component in action should stop, due to a fault, and the supply to the turbine is decreased, the governor will give a starting signal to start that component which is the next due to start. When in the due course of cyclic operation it becomes the turn of the faulty component to start in response to a starting signal, it will probably not start and then the appropriate by-passing throw-over valve device 86 will act.

What I claim as my invention and desire to secure by Letters Patent is:

1. Power plant comprising in combination a plurality of internal-combustion compressor devices, a starting device and a stopping device for each of said compressor devices, a starting signal line, a stopping signal line, means for connecting the starting and stopping devices of the various compressors selectively and sequentially to the starting and stopping signal lines respectively, fuel regulators for said compressors, a start-and-stop signal transmitter connected to said signal lines, means for applying to said transmitter an actuating force in accordance with the setting of said fuel regulators and means for applying an opposing force to said transmitter proportional to the gas discharge pressure from said compressors.

2. Power plant comprising in combination a prime mover, a plurality of internal-combustion compressor devices with their outlets connected in common to the inlet to said prime mover, a starting device and a stopping device for each of said compressors, a starting signal line, a stopping signal line, means for connecting the starting and stopping devices of the various compressors selectively and sequentially to the starting and stopping signal lines respectively, fuel regulators for said compressors spring-biassed towards the "no-fuel" position, fluid pressure motors acting on said regulators in opposition to the biassing force, a speed governor driven by the prime mover, a control valve for said fluid-pressure motors actuated by said governor, a start-and-stop signal transmitter connected to said signal lines, actuating means for said transmitter responsive to the pressure of the fluid in said fluid-pressure motors and opposing means responsive to the pressure of the gas going to said prime mover from the compressors.

3. Power plant comprising in combination a prime mover, a plurality of internal-combustion compressor devices with their outlets connected in common to the inlet to said prime mover, a speed governor driven by the prime mover, fuel regulators for said compressors under the control of said governor, means for starting and stopping said compressor devices in sequence in response to starting and stopping signals, means for transmitting said signals under the control of said governor and means for increasing with increase of gas discharge pressure from said compressors the value of fuel supply per compressor device at which starting and stopping of each compressor device in succession occurs.

4. Power plant comprising in combination a prime mover, a plurality of internal-combustion compressor devices with their outlets connected in common to the inlet to said prime mover, a speed governor driven by the prime mover, fuel regulators for said compressors, actuators for said fuel regulators, signal means moved by said governor for setting said actuators in motion when the prime mover speed rises above and falls below a predetermined value, means for decreasing said predetermined value of speed with increase in gas discharge pressure from said compressors, second signal transmitting means responsive to the said signal means moved by said governor, means for starting and stopping said compressor devices in response to signals from said second signal means and means for increasing with increase of gas discharge pressure from said compressors the value of fuel supply per compressor device at which said second signal device gives signals.

ROBERT JAMES WELSH.

REFERENCES CITED

The following references are of record in the file of this patent:

UNITED STATES PATENTS

| Number | Name | Date |
|---|---|---|
| 2,423,472 | Welsh | July 8, 1947 |
| 2,434,778 | Welsh | Jan. 20, 1948 |

FOREIGN PATENTS

| Number | Country | Date |
|---|---|---|
| 467,561 | Great Britain | June 14, 1937 |
| 183,759 | Switzerland | July 16, 1936 |